United States Patent
Nakano et al.

(10) Patent No.: US 10,249,050 B2
(45) Date of Patent: Apr. 2, 2019

(54) IMAGE PROCESSING APPARATUS AND IMAGE PROCESSING METHOD

(71) Applicant: CANON KABUSHIKI KAISHA, Tokyo (JP)

(72) Inventors: Yuta Nakano, Valbonne (FR); Takaaki Endo, Urayasu (JP); Kiyohide Satoh, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/706,101

(22) Filed: Sep. 15, 2017

(65) Prior Publication Data

US 2018/0089844 A1 Mar. 29, 2018

(30) Foreign Application Priority Data

Sep. 27, 2016 (JP) ................................. 2016-188297

(51) Int. Cl.
| | |
|---|---|
| *G06T 7/00* | (2017.01) |
| *G06T 7/33* | (2017.01) |
| *G06T 7/11* | (2017.01) |
| *G06T 7/149* | (2017.01) |
| *G06T 7/174* | (2017.01) |
| *G06T 7/12* | (2017.01) |

(52) U.S. Cl.
CPC ............ *G06T 7/337* (2017.01); *G06T 7/0014* (2013.01); *G06T 7/11* (2017.01); *G06T 7/12* (2017.01); *G06T 7/149* (2017.01); *G06T 7/174* (2017.01); *G06T 2207/10088* (2013.01); *G06T 2207/10132* (2013.01); *G06T 2207/30068* (2013.01)

(58) Field of Classification Search
CPC ....... G06T 7/0012; G06T 7/0014; G06T 7/11; G06T 7/174; G06T 7/337; G06T 2207/30068; A61B 6/502; A61B 6/5229; A61B 6/5235; A61B 6/5247; A61B 8/5238; A61B 8/5246; A61B 8/5261
See application file for complete search history.

(56) References Cited

U.S. PATENT DOCUMENTS

| | | | |
|---|---|---|---|
| 9,592,019 B2 | 3/2017 | Sugiyama et al. | |
| 2005/0113651 A1* | 5/2005 | Wood et al. ........... | G06Q 50/24 600/300 |
| 2015/0023576 A1* | 1/2015 | Behiels ................ | A61B 6/5235 382/131 |
| 2015/0150531 A1* | 6/2015 | Futamura et al. ... | A61B 6/5247 378/37 |

FOREIGN PATENT DOCUMENTS

JP 2015164516 A 9/2015

\* cited by examiner

*Primary Examiner* — Andrew W Johns
(74) *Attorney, Agent, or Firm* — Rossi, Kimms & McDowell LLP

(57) ABSTRACT

An image processing apparatus that aligns a first image which is an object image including left and right breasts with a second image which is an object image including only one of the left and right breasts, the image processing apparatus comprises an image acquiring unit that acquires the first and second images; an identification information acquiring unit that acquires identification information, which is information to specify whether the left or right breast included in the first image is an alignment target; a region setting unit that sets a region of interest in the first image based on the identification information; and an aligning unit that aligns the region of interest in the first image with the second image.

15 Claims, 9 Drawing Sheets

IMAGE PROCESSING APPARATUS AND IMAGE PROCESSING METHOD

BACKGROUND

Field

The present invention relates to an apparatus that processes an image in which information on the inside of an object is reflected.

Description of the Related Art

In medical image diagnostic fields, a plurality of images, for which imaging apparatuses, imaging timings, imaging parameters, physical positions of objects and the like are different, are sometimes compared. To support such a comparison of images, techniques to align different images by matching the positions of structures which are commonly imaged in the different images, and techniques to quantize the difference between the aligned images, are being considered.

For example, Japanese Patent Application Publication No. 2015-164516 discloses a technique to detect the positions of chest walls and nipples respectively from two different images of a chest, and align the positions of the two images so that the positions of the chest walls and nipples match.

SUMMARY

There is a need to compare an image including only one breast (e.g. image captured by a photoacoustic tomography apparatus) and an image including both breasts (e.g. image captured by MRI).

However, to align the positions of an image including only a left or right breast and an image including both breasts using the method disclosed in Japanese Patent Application Publication No. 2015-164516, the left and right breasts may be confused in alignment. This is because similar feature points in one breast also exist in the other breast. In other words, in prior art, the object images including a breast may not be correctly compared in some cases.

With the foregoing problems of prior art in view, it is an object of the present invention to provide an image processing apparatus which can accurately compares a plurality of object images including a breast.

The present invention in its one aspect provides an image processing apparatus that aligns a first image which is an object image including left and right breasts with a second image which is an object image including only one of the left and right breasts, the image processing apparatus comprising an image acquiring unit that acquires the first and second images; an identification information acquiring unit that acquires identification information, which is information to specify whether the left or right breast included in the first image is an alignment target; a region setting unit that sets a region of interest in the first image based on the identification information; and an aligning unit that aligns the region of interest in the first image with the second image.

The present invention in its another aspect provides an image processing method performed by an image processing apparatus that aligns a first image which is an object image including left and right breasts with a second image which is an object image including only one of the left and right breasts, the image processing method comprising an image acquiring step of acquiring the first and second images; an identification information acquiring step of acquiring identification information, which is information to specify whether the left or right breast included in the first image is an alignment target; a region setting step of setting a region of interest in the first image based on the identification information; and an aligning step of aligning the region of interest in the first image with the second image.

The present invention in its another aspect provides an image processing apparatus comprising an image acquiring unit that acquires an object image including left and right breasts; an identification information acquiring unit that acquires identification information, which is information to specify whether the left or right breast included in the object image is a processing target; an image feature extracting unit that acquires a boundary position to separate the left and right breasts from the object image; and a region setting unit that sets a region of interest including the breast to be the processing target, in the object image based on the identification information and the boundary position.

According to the present invention, a plurality of object images including a breast can be accurately compared.

Further features of the present invention will become apparent from the following description of exemplary embodiments with reference to the attached drawings.

DESCRIPTION OF THE EMBODIMENTS

Figure 1:
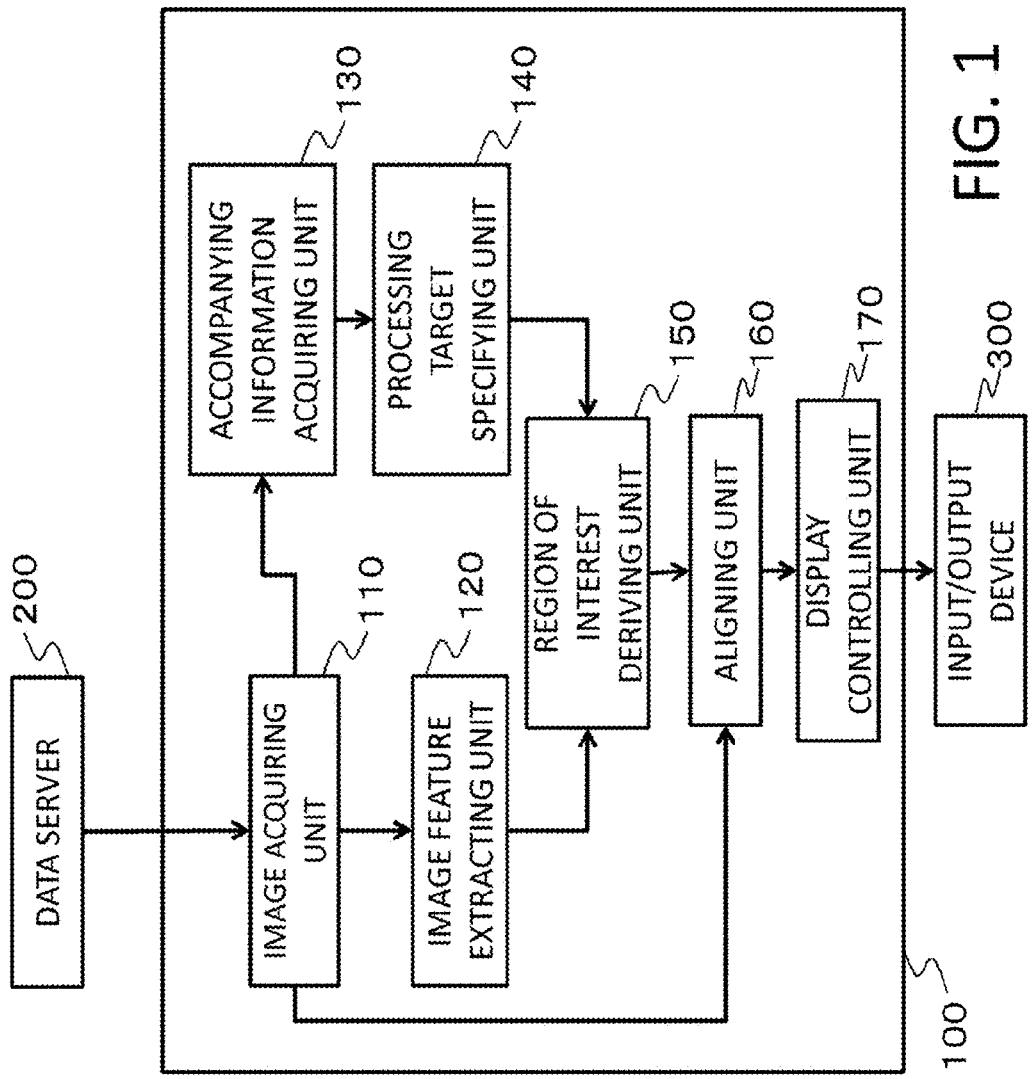
FIG. 1 is a functional block diagram depicting an image processing apparatus according to Embodiment 1.

Embodiments of the present invention will be described in detail with reference to the drawings. In principle, the same composing elements are denoted with the same reference numbers, where redundant description is omitted. Dimensions, materials, shapes and relative positions of the components used for the description of the embodiments should be appropriately changed depending on the configuration and various conditions of the apparatus to which the invention is applied, and are not intended to limit the scope of the invention.

An image processing apparatus according to an embodiment is an apparatus that acquires an image of a breast captured by a nuclear magnetic resonance tomography (MRI) apparatus, and an image of the breast captured by a photoacoustic tomography (PAT) apparatus, and to align the positions of these images.

The photoacoustic tomography apparatus mainly captures an image with inserting one breast into the apparatus, and the captured image (PAT image) is an image including any one of the left and right breasts. In other words, to compare the acquired image with the MRI image, information on whether the left or right breast is the comparison target must be provided.

The image processing apparatus according to the present invention has a function to acquire information on whether the left or right breast is the comparison target (the identification information according to the present invention), and align the positions after determining the comparison target breast.

The aligning processing performed by the image processing apparatus according to the embodiment is not limited to translational processing. For example, the aligning processing may be rotational processing or may be a combination of rotational processing and translational processing. Further, processing to estimate a deformation amount between images, and deform one of the images based on the estimated deformation amount so that the shape and the position match with those of the other image, may be included. Processing to display a deformed image may also be included. The deforming processing and displaying processing of the image, however, are not essential to the present invention.

Embodiment 1

An image processing apparatus according to Embodiment 1 is an apparatus that aligns the positions of a first image which captured both the left and right breasts (e.g. MRI image), and a second image which captured only one of the breasts (e.g. PAT image). In Embodiment 1, it is determined whether the second image is an image of a left or right breast, and the position of the second image is aligned with the first image using this determination result.

In Embodiment 1, the first image and the second image conform to the Digital Imaging and Communications in Medicine (DICOM) standard. In the image format of the DICOM standard, the accompanying information on the image can be held in the header (DICOM header). The accompanying information on the image is, for example, information indicating a patient name, imaging date and time, and left/right breast, but is not limited to this. The image processing apparatus according to Embodiment 1 determines whether the left or right breast included in the first image is an alignment target, based on the information recorded in the header of the second image, and then aligns the positions of the images.

<System Configuration>

A configuration of the image processing system according to Embodiment 1 will be described with reference to FIG. 1. The image processing system according to Embodiment 1 is constituted by an image processing apparatus 100, a data server 200, and an input/output device 300.

First the image processing apparatus 100 will be described. The image processing apparatus 100 includes an image acquiring unit 110, an image feature extracting unit 120, an accompanying information acquiring unit 130, a processing target specifying unit 140, a region of interest deriving unit 150, an aligning unit 160, and a display controlling unit 170.

The image acquiring unit 110 is a unit that acquires object images (first image and second image), which are the processing targets, from the data server 200.

The image feature extracting unit 120 is a unit that extracts the features to be clues to separate the left and right breasts from the first image (that is, an object image including both the left and right breasts). The image feature extracting unit 120 extracts the feature points from the first image. The feature points are, for example, points indicating the body surface, vertexes of the breast, and points corresponding to the breast bone position between the left and right breasts. The features to be extracted need not be points. For example, a contour of the body surface may be extracted.

The accompanying information acquiring unit 130 is a unit that acquires information (accompanying information) which accompanies the second image (that is, object image including only one of the breasts) (the identification information acquiring unit according to the present invention). In Embodiment 1, the accompanying information acquiring unit 130 extracts the header (DICOM header) information from the second image conforming to the DICOM standard.

The processing target specifying unit 140 is a unit that specifies which one of the left or right breast included in the first image is the processing target, based on the header information acquired by the accompanying information acquiring unit 130. For example, if the header information of the second image indicates that this image is an image of the right breast, the processing target specifying unit 140 determines that the right breast is t the aligning processing target.

The region of interest deriving unit 150 is a unit that sets a region of interest (volume of interest (VOI)) in the first image (the region setting information unit according to the present invention). The region of interest is a target region which is aligned with the second image. For example, if it is determined that the right breast is the aligning processing target, a region including the right breast is set as the region of interest in the first image.

The aligning unit 160 is a unit that aligns the position of the region of interest, which is set in the first image, with the second image. For this alignment, translational processing may be performed or rotational processing may be added. The deforming processing may also be added.

The display controlling unit 170 is an interface for outputting the aligned result to the input/output device 300.

The data server 200 is a server apparatus that holds the object images (first image and second image). In Embodiment 1, the first image is an image acquired by a nuclear magnetic resonance tomography (MRI) apparatus, and the second image is an image acquired by a photoacoustic tomography (PAT) apparatus. The modality for capturing the object image is not limited to these, and, for example, an X-ray CT apparatus, an X-ray mammography apparatus, a three-dimensional ultrasonic photographing apparatus, a PET/SPECT apparatus and the like may be used.

The input/output device 300 is a unit that displays various information, such as an image generated by the image processing apparatus 100. The input/output device 300 also includes an input interface for receiving instructions from the user. The input/output device 300 may include a liquid crystal monitor, a keyboard, a mouse and the like, or may be a touch panel display, for example.

<Processing Flow Chart>

Figure 2:
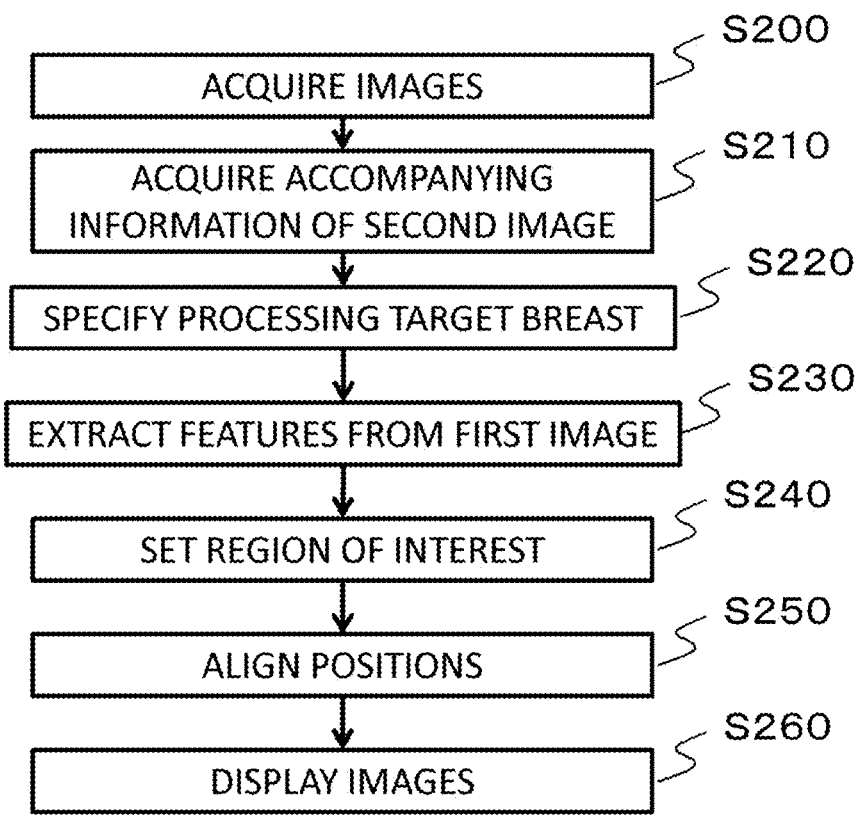
FIG. 2 is a flow chart depicting a processing procedure according to Embodiment 1.

The processing performed by the image processing apparatus 100 according to Embodiment 1 will be described with reference to FIG. 2.

First in step S200, the image acquiring unit 110 acquires a first image and a second image, which are aligning processing targets, from the data server 200. In Embodiment 1, the first image is an image captured by MRI, and the second image is an image captured by PAT. The first image and the second image are both images of the chest area, but the first image includes both the left and right breasts, and the second image includes only one of the left and right breasts.

Then in step S210, the accompanying information acquiring unit 130 acquires the accompanying information from the second image acquired in step S200. In Embodiment 1, the accompanying information acquiring unit 130 reads a tag (e.g. "Left" or "Right" indicating the left or right breast) included in the DICOM header as the accompanying information.

Then in step S220, the processing target specifying unit 140 specifies whether the left or right breast is the aligning processing target, based on the accompanying information of the acquired second image. In concrete terms, if "Right (right breast)" is recorded in the accompanying information of the second image, the right breast included in the first image becomes the aligning processing target. And if "Left (left breast)" is recorded in the accompanying information of the second image, on the other hand, the left breast included in the first image becomes the aligning processing target.

Since the first image includes both the left and right breasts, these breasts must be separated to perform the alignment processing.

In step S230, the image feature extracting unit 120 extracts the features to be clues to separate the left and right breasts from the first image acquired in step S200. In Embodiment 1, (1) body surface boundary of the object, (2) points corresponding to the vertexes of the left and right breasts, and (3) points corresponding to the breast bone between the left and right breasts (boundary position) are detected as the features.

A method for detecting the body surface boundary of the object will be described.

First, a smoothing processing using a median filter is performed for the first image. Then a body region, including the breasts, is extracted by the threshold processing. Then the isolated regions existing in the background are deleted by the labeling processing, and a remaining region is regarded as a foreground region.

Figure 3:
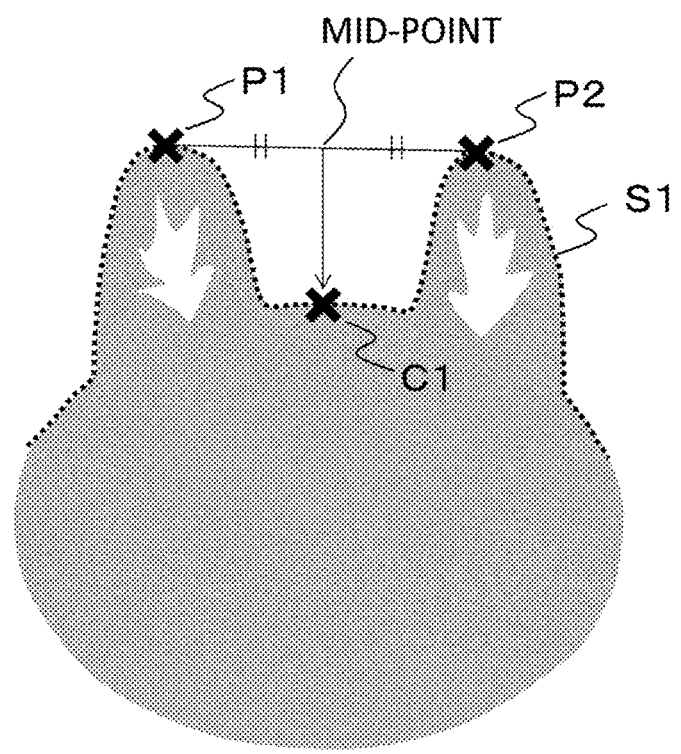
FIG. 3 is a diagram depicting a feature point extracting method according to Embodiment 1.

Then in the binary image acquired by these processing (image in which different values are set for the foreground region and the background regions), the body surface boundary is searched from the top end (chest side) of the image in the downward direction (direction toward the back side), and the points crossing with the foreground region are regarded as the body surface boundary. FIG. 3 is an example depicting the body surface boundary detected in the first image. The dotted line S1 in FIG. 3 is the detected body surface boundary.

The first image according to Embodiment 1 is a three-dimensional volume image, but in FIG. 3, only one cross-section (axial cross-section (transverse section)) is illustrated to simplify depiction.

A method for specifying the vertexes of the left and right breasts and the points corresponding to the breast bone separating the left and right breasts, using the detected body surface boundary, will be described next.

First, the first image is horizontally separated into two by the sagittal cross-section that passes through the mid-point of the horizontal axis of the first image (cross-section indicated by the arrow), and the body surface boundary existing at the highest point (chest side) in the left region is regarded as the vertex P1 of the right breast, and the body surface boundary existing at the highest point in the right region is regarded as the vertex P2 of the left breast.

Then the image feature extracting unit 120 connects the detected vertexes P1 and P2 of the two breasts by a line, and draws a vertical line (line in parallel with the ventrodorsal axis) from the mid-point toward the body surface boundary.

Finally the image feature extracting unit 120 specifies the intersection of this vertical line and the body surface boundary as the breast bone position C1. FIG. 3 depicts an example of the vertexes P1 and P2 of the two breasts and the breast bone position C1 detected in the first image. The method of specifying the breast bone position C1 is not limited to this. For example, an intersection of the line connecting P1 and P2 and the sagittal cross-section passing through the mid-point in the horizontal axis is determined, then the vertical line is drawn from this intersection to the body surface boundary side, and the intersection of this vertical line and the body surface boundary is specified as C1. Or an intersection between the axial cross-section passing through the mid-point of the cranio-caudal axis and the sagittal cross-section passing through the mid-point of the horizontal axis is determined, then the vertical line is drawn from this intersection to the body surface boundary side, and the intersection of this vertical line and the body surface boundary is specified as C1.

In FIG. 3, the vertexes P1 and P2, and the breast bone position C1 are included in one axial cross-section of the first image to simplify depiction, but in actual fact, P1, P2 and C1 are not always on the same axial cross-section.

In step S240, the region of interest deriving unit 150 sets a region including a breast to be the alignment target (region of interest in the first image). In Embodiment 1, the region of interest is set for the breast specified in step S220, using the image features extracted in step S230.

Figure 4:
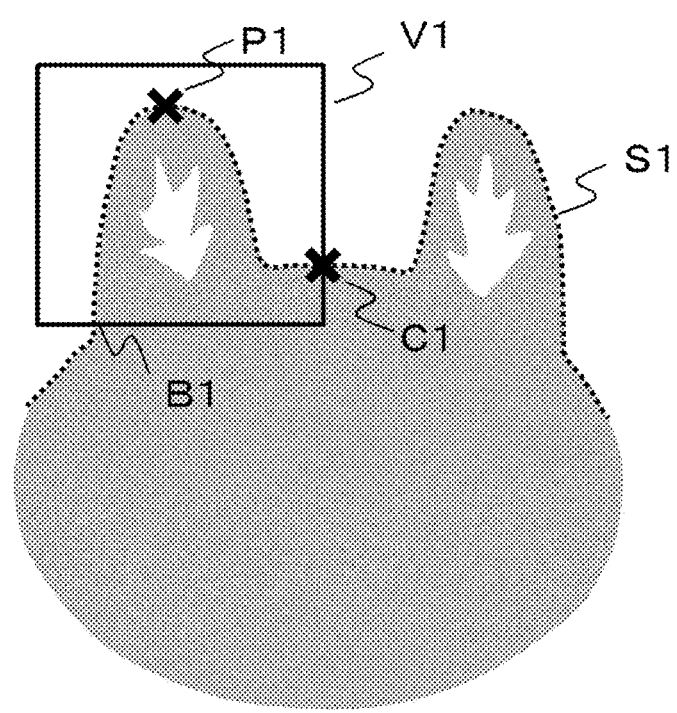
FIG. 4 is a diagram depicting a region of interest setting method according to Embodiment 1.

FIG. 4 is an example of setting a region of interest when the processing target is the right breast. In this case, the upper end of the region of interest V1 is set in a position determined by taking a predetermined margin in the upward direction from the vertex P1 of the right breast. The lower end of the region of interest V1 is set in a position determined by taking a predetermined margin in the downward direction from the breast bone position C1. The right end of the region of interest V1 is set in the breast bone position C1. The left end of the region of interest V1 is set in a position determined by taking a predetermined margin outward from the body surface from the point B1, where the bottom end of the region of interest V1 crosses with the body surface S1 on the left side of the image.

Further, the ends of the region of interest V1 in the depth direction are set in positions determined by taking a predetermined margin from the breast bone position C1 in the front and back of the depth direction (cranio-caudal direction) in FIG. 4.

The case of the right breast was described here as an example, but if the processing target is the left breast, processing in which left and right are reversed, as in the above description, should be performed using the vertex P2 of the left breast.

As long as the specified processing target (left breast or right breast) is included, the method for deriving the region of interest is not limited to the above mentioned method. For example, if the processing target is the right breast, the pectoral muscle surface is further extracted in the first image for the region on the left side of the breast bone position C1, and the region including the body surface S1 and the pectoral musical surface is regarded as the region of interest.

Then in step S250, the aligning unit 160 aligns the positions of the region of interest in the first image, which was set in step S240, and the second image. Here alignment is performed with estimating the deformation amount between the region of interest, which is set in the first image, and the second image (that is, the deformation alignment). This processing is implemented by extracting the partial image of the region of interest from the first image, and estimating the deformation amount between this partial image and the second image.

By setting the region of interest like this, alignment with the comparison target breast can be performed even if both the left and right breasts are included in the first image.

An example of the method of estimating the deformation amount between the images is a method of using free-form deformation (FFD) as the deformation model, and using image similarity as the evaluation scale. The deformation model and evaluation scale used here as examples for estimating deformation, however, are not the only methods. For example, feature points corresponding to each image are extracted using input by the operator or image processing, and deformation is performed so that these feature points of the images are corresponded with each other. In this case, thin plate spline (TPS), for example, can be used as the deformation model.

Further, based on the estimated deformation amount, the aligning unit 160 generates an image that is deformed such that the shape of one of the images matches with the shape of the other image (deformed image). In Embodiment 1, the deformed image is generated by deforming the second image such that the shape of the partial image (region of interest) extracted from the first image matches with the shape of the object. The range of the deformed image to-be-generated preferably corresponds to the region of interest in the first image.

The processing to extract the region of interest from the first image may be omitted. For example, only the inside of the region of interest may be handled as a target of deformation alignment. In this case as well, it is preferable that the range of the deformed image to be generated corresponds with the region of interest.

It may not always be the second image that is deformed. For example, the first image may be deformed such that the shape of the object matches with the second image. In this case, the calculation amount to generate the deformed image can be decreased only if the region of interest, instead of the entire region of the first image, is set to be the target of deformation.

Finally in step S260, the display controlling unit 170 outputs the result of the deformation alignment performed in step S250 via the input/output device 300. In Embodiment 1, the tomographic image corresponding to the region of interest, which is set in the first image, and the tomographic image corresponding to the deformed and aligned second image (deformed image) are displayed side by side. The display method is not limited to this. For example, the tomographic image of the region of interest in the first image and the tomographic image of the deformed and aligned second image (deformed image) may be displayed in a superimposed state (superimposed display).

As described above, according to Embodiment 1, the image processing apparatus aligns the positions of a first image which includes both breasts and a second image which includes only one of the breasts, and specifies a breast to be the aligning processing target based on the information accompanying the second image. Thereby corresponding errors can be prevented.

In Embodiment 1, it is assumed that the first image always includes both breasts and the second image includes only one breast. However, the images to be input to the image processing apparatus 100 need not always be the above combination.

For example, both the first and the second images may be images which include one side of the breasts. In this case, whether the pair of images satisfy a predetermined condition (that is, whether these are breasts on the same sides) may be determined based on the information accompanying these images, so that the above processing is performed only when the condition is satisfied.

The modality types of the first image and the second image may be acquired from the respective accompanying information, so that the content of the processing is changed based on the combination of the modality types. For example, the above processing may be performed only when the modality type of the first image is a modality to image both breasts (e.g. MRI, CT), and the modality type of the second image is a modality to image only one of the breasts (e.g. PAT, mammo CT, breast tomo-synthesis). If the combination of modalities is other than the above mentioned cases (e.g. both PATs, both MRIs), then processing from step S210 to step S240 may be omitted.

Embodiment 2

Figure 5:
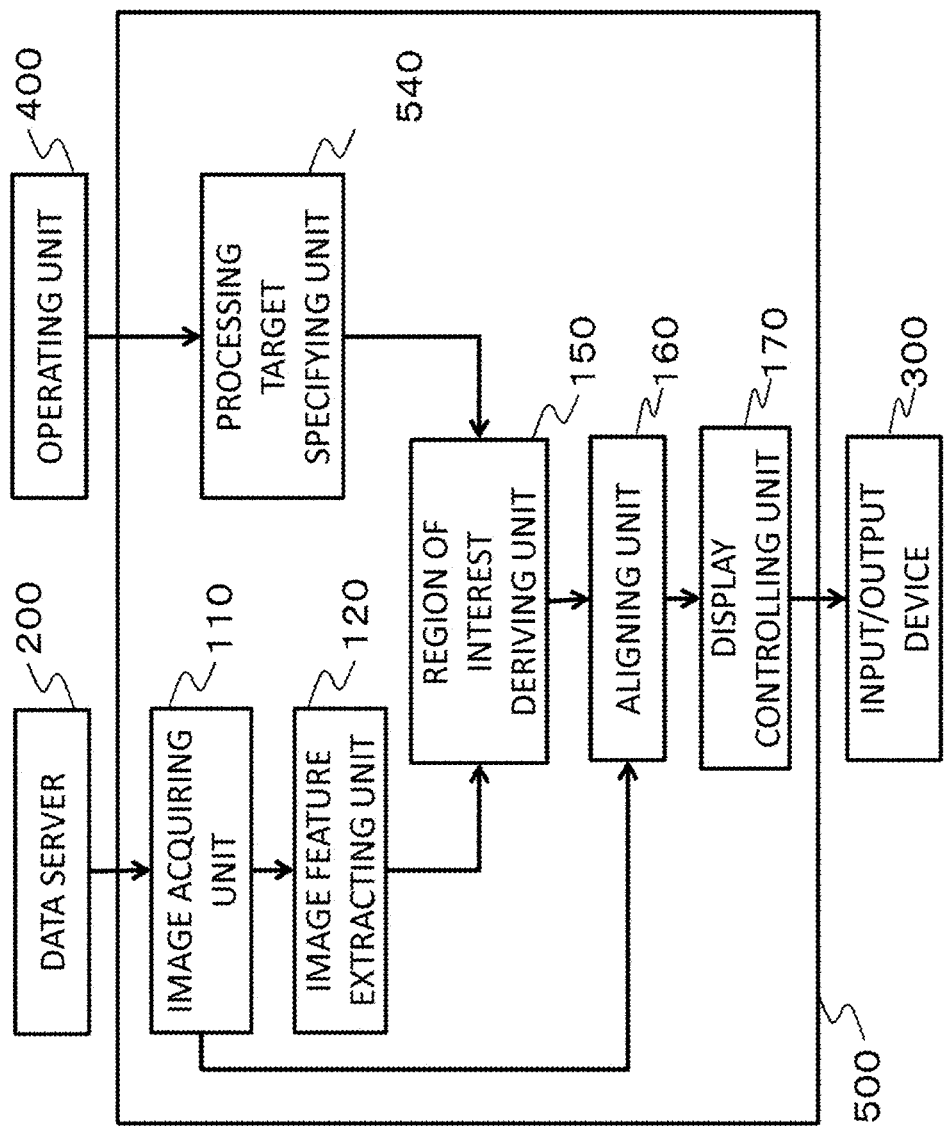
FIG. 5 is a functional block diagram depicting an image processing apparatus according to Embodiment 2.

Embodiment 2 is an embodiment in which the user directly specifies the processing target breast. An image processing apparatus 500 according to Embodiment 2 will be described with reference to the block diagram in FIG. 5. A composing element common with Embodiment 1 is denoted with the same reference sign, for which description is omitted.

The differences of the image processing apparatus 500 of Embodiment 2 from Embodiment 1 are that the accompanying information acquiring unit 130 is not included, and the processing target specifying unit 540 specifies whether the left or right breast is the processing target, based on the information input from the operating unit 400.

The operating unit 400 is a unit that acquires information, to specify whether the left or right breast included in the first image is the aligning processing target, via the user interface (identification information acquiring unit according to the present invention). The processing target specifying unit 540 specifies the breast to be the aligning processing target, based on the information acquired via the operating unit 400.

Figure 6:
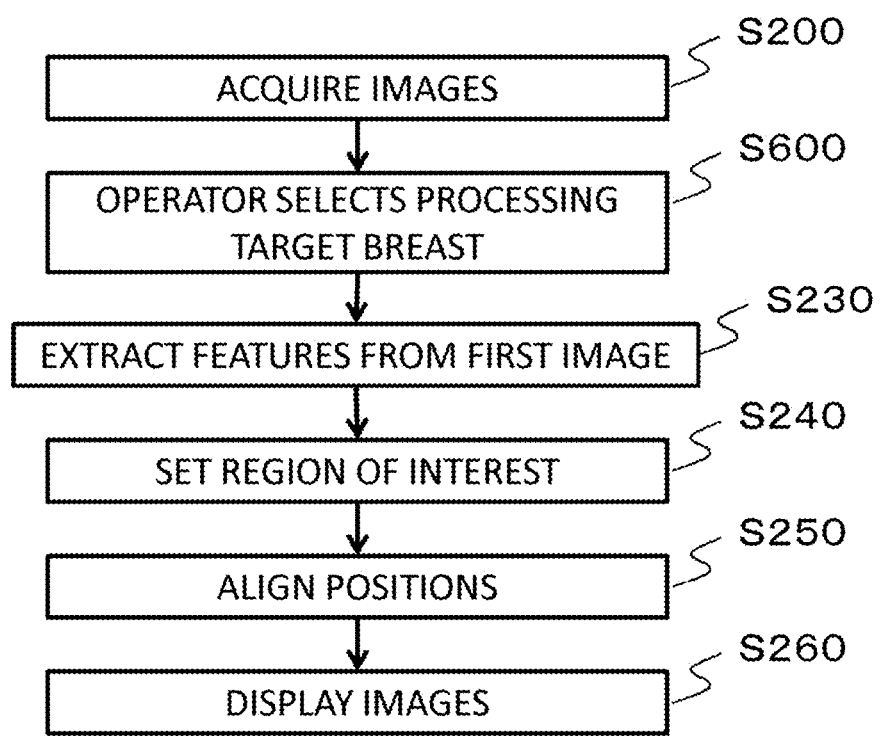
FIG. 6 is a flow chart depicting a processing procedure according to Embodiment 2.

FIG. 6 is a flow chart depicting a general processing procedure performed by the image processing apparatus 500. Processing other than step S600 is the same as Embodiment 1, therefore description thereof is omitted.

Figure 7:
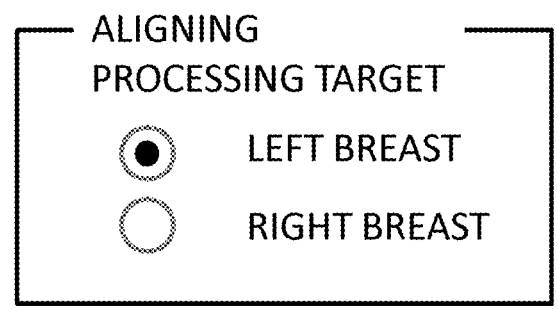
FIG. 7 is a diagram depicting an interface to select an alignment target.

In step S600, the processing target specifying unit 540 acquires information to specify the processing target breast via the operating unit 400. In concrete terms, the operator selects the left or right breast to be the processing target via such an interface screen as FIG. 7.

The method for selecting the processing target breast is not limited to this. For example, the operator may specify the processing target breast using a pointing device such as a mouse on the first image displayed on the input/output device 300. In this way, the operating unit 400 may share hardware with the input/output device 300.

When the left or right breast is specified, the position of the nipple (position of the base of the nipple) of the processing target breast may be specified. For example, the three-dimensional coordinates of the nipple position may be specified and used as the input information of the aligning processing which is performed in step S250. In this way, the nipple position, which is used for the aligning processing, may be specified at the same time as specifying the left or right breast to be the processing target. The nipple position in the second image may also be specified at the same time.

According to Embodiment 2, a breast to be the alignment target can be specified even if information indicating whether the left or right breast is imaged does not accompany the image.

Embodiment 3

Embodiment 3 is an embodiment in which the left or right breast to be the alignment target is specified by performing image processing on the second image. An image processing apparatus 800 according to Embodiment 3 will be described with reference to the block diagram in FIG. 8. A composing element the same as Embodiment 1 is denoted with the same reference sign, for which description is omitted.

Figure 8:
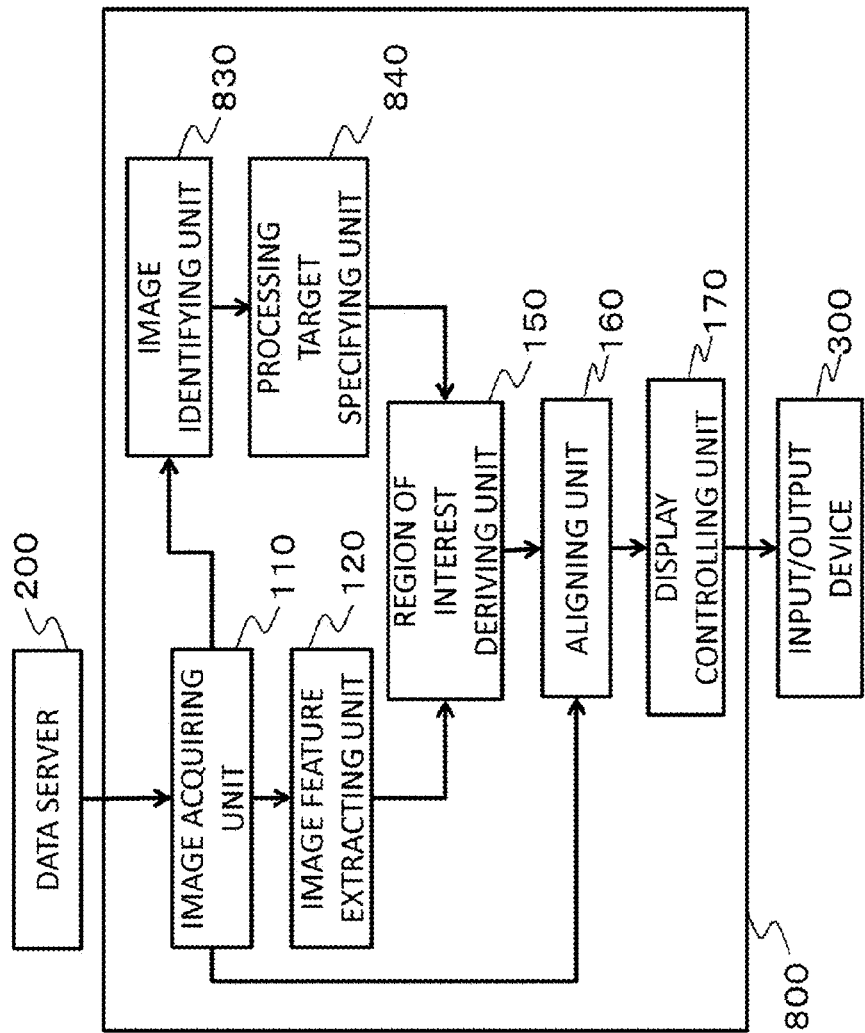
FIG. 8 is a functional block diagram depicting an image processing apparatus according to Embodiment 3.

FIG. 8 is a block diagram depicting the image processing apparatus 800 according to Embodiment 3. The difference of the image processing apparatus 800 of Embodiment 3 from Embodiment 1 are that the image identifying unit 830 is included instead of the accompanying information acquiring unit 130, and the processing target specifying unit 840 specifies the processing target breast based on the result of identifying the image.

The image identifying unit 830 is a unit that identifies whether the left or right breast is included in the second image by performing the image identifying processing on the second image. The processing target specifying unit 840 specifies whether the left or right breast is the aligning processing target, based on the identification result acquired by the image identifying unit 830.

Figure 9:
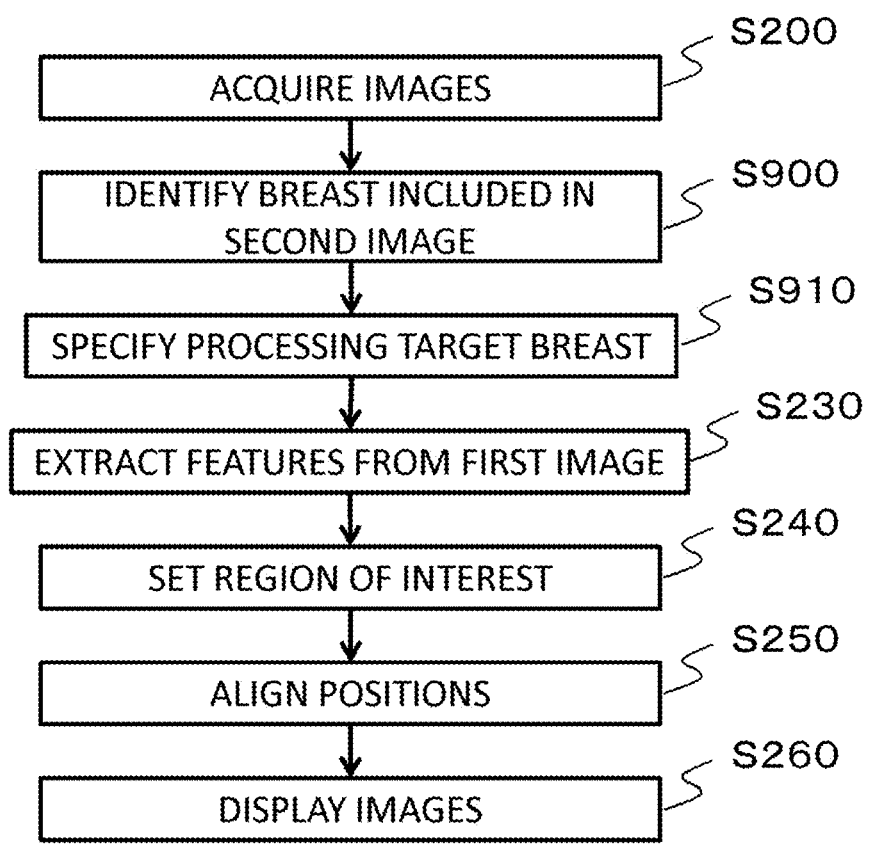
FIG. 9 is a flow chart depicting a processing procedure according to Embodiment 3.

FIG. 9 is a flow chart depicting a processing procedure performed by the image processing apparatus 800. Processing other than steps S900 and S910 is the same as Embodiment 1, therefore description thereof is omitted.

In step S900, the image identifying unit 830 performs the image identifying processing on the second image acquired in step S200, and identifies whether the left or right breast is included in the second image. The identification information ("Left" or "Right") which indicates the result of this identifying processing is output to the processing target specifying unit 840.

For the image identifying processing, a known image identifying method can be used. For example, an identification device learns many images in which the identification of the left or right breast is known as learning data, and the image identifying processing is performed using this identification device.

For machine learning, any known technique, such as a neural network and support vector machine, may be used. The image identifying processing is this step may be performed using a method other than machine learning. For example, an analytical approach, such as analyzing the nipple position and the body surface shape, may be used. Or a typical breast shape model may be applied to the second image, so that the identifying processing is performed based on the acquired residual. For example, the residual when the right breast shape model is applied to the second image is compared with the residual when the left breast shape model is applied to the second image, and the breast for which the residual is smaller is identified as the actual breast in the image.

In step S910, the processing target specifying unit 840 specifies whether the left or right breast is the aligning processing target based on the identification information acquired in step S900. In concrete terms, if the acquired identification information is "Right", the right breast included in the first image becomes the aligning processing target. If the acquired identification information is "Left", on the other hand, the left breast included in the first image becomes the aligning processing target.

According to Embodiment 3, a breast to be the alignment target can be specified even if information indicating whether the left or right breast is imaged does not accompany the image.

Modifications

The above description of each embodiment merely exemplifies the present invention, and the present invention may be carried out by changing or combining the embodiments within the scope of the spirit of the invention.

For example, the present invention may be carried out as an image processing apparatus that includes at least a part of the above processing. Further, the present invention may be carried out as an image processing method that includes at least a part of the above processing. The above mentioned processing and units can be freely combined as long as no technical inconsistency is generated.

In the description of each embodiment, the left or right breast which was captured in the second image is determined by a respective method, but a plurality of different methods may be used together. For example, in the case when the information accompanying the second image includes identification information to determine the left or right breast that is captured in the second image, this information is used, and if the identification information is not included, the identifying processing is performed using the method described in Embodiment 2 or Embodiment 3.

Further, the identified result may be presented to the user so that the user can make corrections. Thereby alignment can be performed without error for all kinds of input data.

In the description on each embodiment, the region of interest extracted from the first image is aligned with the second image, but this aligning processing is not always required. For example, the region of interest extracted from the first image may be simply stored as an image that includes the breast on the same side as that of the second image. Here if the image of the extracted region of interest and the second image are displayed side by side, the first image and the second image can be easily compared without confusing the left and right breasts. In this case, it is preferable that the user can interactively align the displayed two images on the display screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188297, filed on Sep. 27, 2016, which is hereby incorporated by reference herein in its entirety.

What is claimed is:

1. An image processing apparatus that aligns a first image which is an object image including left and right breasts with a second image which is an object image including only one of the left and right breasts, the image processing apparatus comprising:
   an image acquiring unit that acquires the first and second images;
   an identification information acquiring unit that acquires identification information, which is information to specify whether the left or right breast included in the first image is an alignment target;
   a region setting unit that sets a region of interest in the first image based on the identification information; and
   an aligning unit that aligns the region of interest in the first image with the second image.

2. The image processing apparatus according to claim 1, wherein
   the region setting unit acquires a boundary position to separate the left and right breasts based on the first image, and sets the region of interest further based on the boundary position.

3. The image processing apparatus according to claim 1, wherein
   the identification information acquiring unit acquires information accompanying the second image as the identification information.

4. The image processing apparatus according to claim 3, wherein
   the second image is an image conforming to the DICOM standard, and the information accompanying the second image is information included in the DICOM header.

5. The image processing apparatus according to claim 1, wherein
   the identification information acquiring unit acquires the identification information based on a result of analyzing the second image.

6. The image processing apparatus according to claim 5, wherein
   the identification information acquiring unit acquires the identification information based on the position of a nipple or the shape of a body surface included in the second image.

7. The image processing apparatus according to claim 1, wherein
   the identification information acquiring unit acquires information input by a user as the identification information.

8. An image processing method performed by an image processing apparatus that aligns a first image which is an object image including left and right breasts with a second image which is an object image including only one of the left and right breasts, the image processing method comprising:
   an image acquiring step of acquiring the first and second images;
   an identification information acquiring step of acquiring identification information, which is information to specify whether the left or right breast included in the first image is an alignment target;
   a region setting step of setting a region of interest in the first image based on the identification information; and
   an aligning step of aligning the region of interest in the first image with the second image.

9. The image processing method according to claim 8, wherein
   in the region setting step, a boundary position to separate the left and right breasts is acquired based on the first image, and the region of interest is set further based on the boundary position.

10. The image processing method according to claim 8, wherein
    in the identification information acquiring step, information accompanying the second image is acquired as the identification information.

11. The image processing method according to claim 10, wherein
    the second image is an image conforming to the DICOM standard, and the information accompanying the second image is information included in the DICOM header.

12. The image processing method according to claim 8, wherein
    in the identification information acquiring step, the identification information is acquired based on a result of analyzing the second image.

13. The image processing method according to claim 12, wherein
    in the identification information acquiring step, the identification information is acquired based on the position of a nipple or the shape of a body surface included in the second image.

14. The image processing method according to claim 8, wherein
    in the identification information acquiring step, information input by a user is acquired as the identification information.

15. An image processing apparatus comprising:
    an image acquiring unit that acquires an object image including left and right breasts;
    an identification information acquiring unit that acquires identification information, which is information to specify whether the left or right breast included in the object image is a processing target;
    an image feature extracting unit that acquires a boundary position to separate the left and right breasts from the object image; and
    a region setting unit that sets a region of interest including the breast to be the processing target, in the object image based on the identification information and the boundary position.

* * * * *